July 21, 1953

A. V. RAUGHT 2,645,988

REAR GANG FOR TRACTOR CULTIVATORS

Filed Feb. 28, 1946

INVENTOR.
Arthur V Raught
BY
Emerson B Donnell
ATTORNEY.

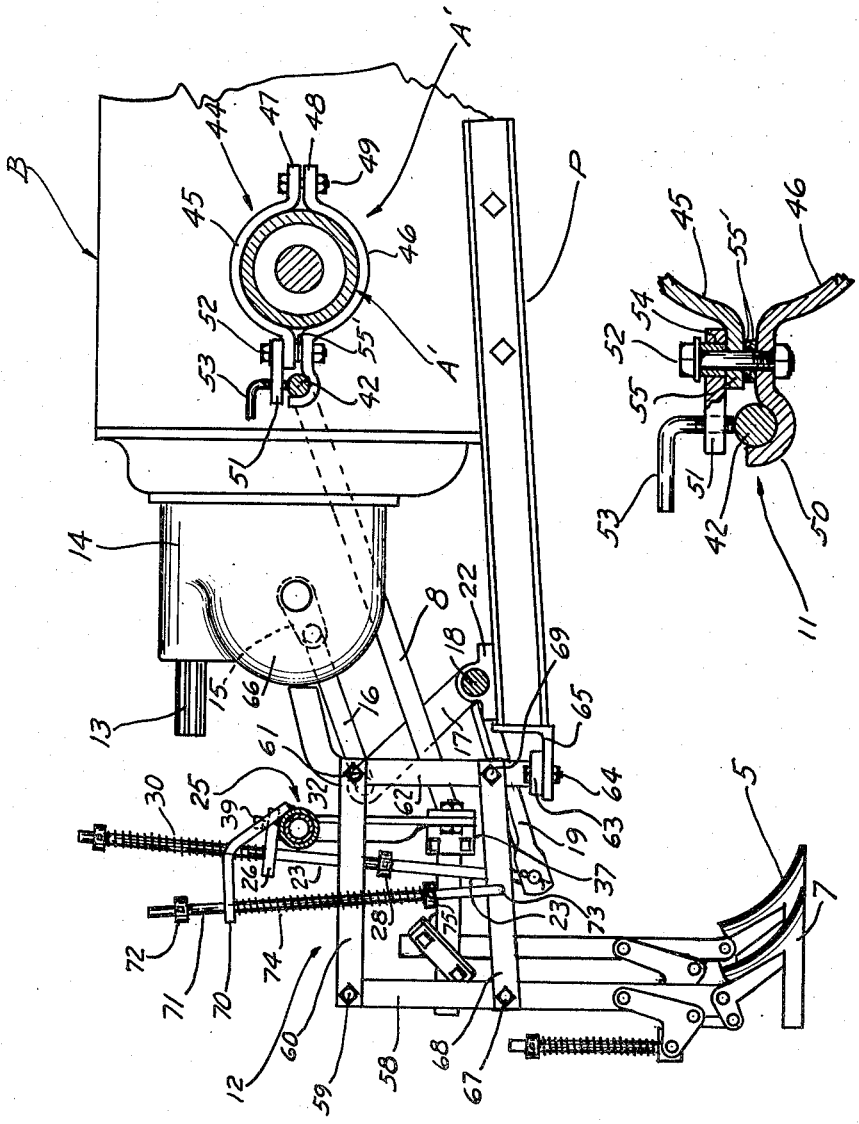

Patented July 21, 1953

2,645,988

UNITED STATES PATENT OFFICE 2,645,988

REAR GANG FOR TRACTOR CULTIVATORS

Arthur V. Raught, Rockford, Ill., assignor to J. I. Case Company, Racine, Wis., a corporation of Wisconsin Application February 28, 1946, Serial No. 650,793

1 Claim. (Cl. 97—46.43)

The present invention relates to ground working implements and particularly to such as are intended to be mounted on the propelling vehicle or tractor and an object thereof is to generally improve the construction and operation of devices of this type.

Tractors of the type contemplated normally have three wheels and commonly carry soil working implements at or adjacent the front thereof for working the soil in proximity to the growing crop. The tractor wheels, however, tend to pack the soil to some extent and accordingly such tractors commonly carry other soil working tools at the rear which normally register with the wheel tracks so as to loosen the soil and eliminate the effect of the packing thereof. A further object of the invention is to improve the latter soil working tools at the rear of the tractor.

A further object is to provide a plurality of such tools arranged substantially in a line transverse to the direction of travel and which have substantially equal freedom for floating to follow surfaces of irregular contour.

Many tractors provide ample opportunity for attachment of such tools near the sides thereof with long swinging draw bars so that free floating is easily provided. However, at the center of the tractor certain structure commonly projects toward the rear a substantial distance and interferes with the location of such a long draw bar. Accordingly, the principle object of the invention is to provide for mounting such tools so that the center tool will have equal opportunity to float with the outer tools.

Another object is to provide such a structure which can be very quickly mounted and dismounted and other objects will become apparent from the following specification and accompanying drawings in which a satisfactory embodiment of the invention is shown. However, it is to be understood that the invention is not limited to the details disclosed but includes all such variations and modifications as fall within the spirit of the invention as herein expressed.

In the drawing,

Fig. 3 is a vertical sectional view on the line 3—3 of Fig. 1 with parts removed.

Fig. 4 is a vertical sectional view on the line 4—4 of Fig. 1.

Similar reference characters have been applied to the same parts throughout the drawings and specification.

Figures 1, 2:
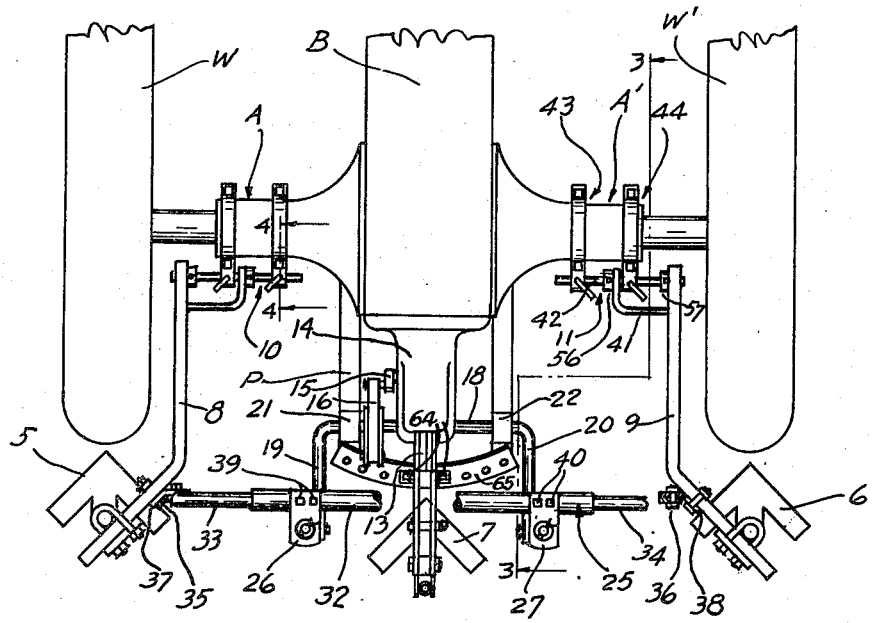
Figure 1 is a plan view of so much of a tractor as is necessary to illustrate the invention and with the soil working tools attached.
Fig. 2 is a rear elevation of the same.

As seen in Fig. 1, the tractor has a body portion B, axle portions A and A', wheels W and W' and a rearwardly projecting platform or drawbar structure P. It will, of course, be understood that the tractor has an engine, front wheel $W^2$, Fig. 2, steering gear and numerous other parts all well-known and forming no part of the present invention and which are accordingly not illustrated.

Wheels W, W' and $W^2$ pack the soil to some extent upon passage of the tractor and in order to loosen this slightly packed soil and avoid the affect thereof, cultivator shovels or other soil working tools 5 and 6 are disposed in the rear of wheels W and W' and a substantially similar tool 7 is disposed in the rear of wheel $W^2$, tools 5, 6 and 7 being preferably substantially in line transversely with the tractor. The exact form of tools 5, 6 and 7 will vary according to soil conditions and for other reasons and the invention is not limited to any particular type of tool, ordinary cultivator shovels being conventionally represented.

It is desirable for use under many conditions that tools 5, 6 and 7 be free to rise and fall to accommodate themselves to uneven ground. For this reason, tools 5 and 6 are supported and propelled by relatively long draw bars 8 and 9 connected with axle portions A and A'. Draw bars 8 and 9 are connected to their respective axle portions by means of pivot structures generally designated as 10 and 11 so as to give free up and down pivotal movement while preventing any substantial sidewise movement.

Tool 7, as will be apparent from Figs. 1 and 3, is disposed directly behind platform P and in order to provide free floating, a parallel motion linkage generally designated as 12 is interposed between tool 7 and platform P.

Suitable mechanism is provided for lifting the tools as follows. The tractor is provided with a power take-off shaft 13 of well-known form which actuates a cyclic power lift clutch 14 having a crank 15 arranged to rotate one-half turn and stop upon each actuation of the power lift in a manner too well-known to require further description. Crank 15 actuates through a pitman 16, a lever 17 on a rockable bail 18. Bail 18 has rearwardly extending arms 19 and 20 and is journaled in bearings 21 and 22 carried on platform P. Arms 19 and 20 have pivoted thereto upwardly extending lift rods 23 and 24 which act, upon upward swinging of arms 19 and 20, to lift a connecting element or arch 25, rods 23 and 24 passing slidably through ears 26 and 27 suitably fixed to arch 25. Collars as 28 and 29 on rods 23 and 24 engage ears 26 and 27 after predetermined movement of rods 23 and 24, and springs 30 and 31, in the position of the parts shown, press downwardly on ears 26 and 27 to exert a gentle downward pressure on tools 5 and 6 as will appear.

Arch 25 preferably comprises a central outer section 32 carrying above mentioned ears 26 and 27 and in which are slidably disposed outer sections 33 and 34 preferably bending downwardly and pivotally connected at 35 and 36 with brackets 37 and 38 clamped respectively on draw bars 8 and 9. Arch 25 therefore when lifted also raises draw bars 8 and 9 and accordingly tools 5 and 6. Pivotal connections 35 and 36, however, provide for independent up and down movement of draw bars 8 and 9.

Arch 25 also effectively braces draw bars 8 and 9 against sideward deflection caused by ground reactions or other forces. Portions 33 and 34 are maintained in position in the present instance by set screws 39—39 and 40—40. By loosening screws 39 and 40, arch 25 may therefore be adjusted so as to properly fit the spacing of tools 5 and 6. It is to be noted, however, that such adjustment of spacing does not require any adjustment whatever of the power lift bail 18 or power lift parts in order to accommodate adjustments of pivots 10 and 11.

Returning to a more detailed description of pivots 10 and 11, pivot 11 being substantially identical with pivot 10, it will not be necessary to describe both. Draw bar 9 has a brace 41 extending laterally therefrom, the draw bar and brace being apertured for the reception of a pivot shaft 42 by means of which draw bar 9 is supported and propelled. Shaft 42 is carried in clamping bracket members 43 and 44 spaced on axle portion A' to which shaft 42 may be readily and rigidly attached. As seen in Fig. 3, bracket member 44 comprises upper and lower clamping sections 45 and 46 having outturned ears 47 and 48 urged toward each other by means of a clamping bolt 49. Portion 46 has a rearwardly extending upwardly open socket portion 50 in which shaft 42 may be received. A tongue 51 freely pivoted on a bolt 52 extends above socket 50 and carries a set screw 53 preferably of a type which may be turned by hand into engagement with shaft 42 to rigidly maintain the latter in socket 50. With screw 53 retracted, tongue 51 may be swung to one side of shaft 42 so that the shaft may readily be lifted out of socket 50. In this manner, draw bar 9 and its attached parts may be quickly removed from axle portion A'.

Any suitable expedient may be used to unite portions 45 and 46 in the region of bolt 52, in the present instance a bushing 54, Fig. 4, on bolt 52 communicating clamping pressure to an ear 55 on section 45 while supporting bolt 52 against exerting clamping pressure on tongue 51. A washer 55' may be interposed between sections 45 and 46 for adjusting or other purposes, if desired.

Clamping bracket 43 being preferably identical with bracket 44 need not be further described.

Collars 56 and 57 on shaft 42 prevent displacement of draw bar 9 along shaft 42.

Tool 7 being spaced only a short distance rearwardly of platform P requires a somewhat different support than tools 5 and 6. It has an upwardly extending shank 58 pivoted at 59 to a link 60 preferably bifurcated and pivoted at 61 to a brace 62 extending substantially parallel to shank 58. Brace 62 has a foot portion 63 fastened as by bolts 64 to a quadrant portion 65 of platform P. At its upper extremity, brace 62 bends forwardly into contact with the housing 66 of above mentioned power lift 14. At a point spaced downwardly along shank 58, from pivot 59, a pivot 67 connects shank 58 with a link 68 preferably bifurcated and pivoted at 69 to brace 62. Links 60 and 68 may be substantially parallel but it is contemplated that the lengths and angles thereof and of shanks 58 and 62 may be so proportioned as to obtain any desired condition of up and down travel of tool 7. In this manner, a floating action of tool 7 may be obtained which is substantially similar to the floating action of tools 5 and 6 in spite of the comparatively short distance from shank 58 to platform P.

Arch member 25 has a bracket 70 extending upwardly and rearwardly therefrom and through which is slidably arranged a lifting rod 71. A collar 72 on rod 71 is spaced above bracket 70 so as to be contacted upon substantial upward movement of arch 25. The remaining movement then raises rod 71 which, being pivoted at 73 to above mentioned link 68 actuates the latter to lift shank 58 and tool 7. A spring 74 compressed between bracket 70 and a collar 75 on rod 71 exerts a gentle downward pressure on the rod and link 68 to yieldingly maintain tool 7 in the ground, it being understood that the resistance to penetration of the ground by tool 7 will prevent dropping of the shank 58 and connected parts including the collar 72 below the position shown.

The operation of the arrangement is thought to be clear from the foregoing, it being apparent that tools 5, 6 and 7 are carried in registration with the three wheels of the tractor and are free to rise and fall and follow the inequalities in the ground. The spacing of tools 5 and 6 is accurately maintained by arch 25, the length of which may be adjusted by loosening set screws 39 and 40. It will be apparent that draw bars 8 and 9 may be shifted on their respective pivot shafts if the tread of wheels W and W' is changed. Collars 56 and 57 may be relocated to maintain draw bar 9 in other desired positions. The same thing is true of draw bar 8. Tool 7 has a free floating movement due to parallel motion 12 in spite of the relatively close spacing to platform P. The several tools are lifted through the agency of arch 25 upon actuation of power lift 14.

The above being a complete description of an illustrative embodiment of the invention, what is claimed as new and desired to be secured by Letters Patent of the United States is:

In a ground working implement for mounting on a tractor having a central rearwardly projecting encumbrance including a platform, the combination of outer and intermediate tools arranged in a series across the width of the rear of the tractor, the outer tools being swingable in the path of an arc from pivot points forwardly of the rearwardly projecting encumbrance, an arch member pivotally connecting said outer tools to maintain predetermined spacing thereof while providing free floating of said outer tools, power lift means on the tractor, a connection from the power lift means to said arch for lifting the same and through it said outer tools, an upstanding brace on said platform, upper and lower substantially parallel links extending rearwardly from said brace, an upright shank connecting the rear extremeties of said links and carrying at its lower end said intermediate tool, a lifting connection from said arch to said intermediate tool comprising a lifting element connected to one of said links at a point displaced from said shank toward said brace so as to lift said intermediate tool through a substantially greater distance than the movement of said arch, said element providing lost motion for free floating movement of said intermediate tool, said lost motion being of sufficient extent to cause delay in lifting said intermediate tool as related to said outer tools and lifting of said intermediate tool, upon actuation of said power lift, a total amount substantially equal to that of said outer tools.

ARTHUR V. RAUGHT.

References Cited in the file of this patent

UNITED STATES PATENTS

| Number | Name | Date |
|---|---|---|
| 1,132,554 | Brett | Mar. 23, 1915 |
| 1,831,990 | Benjamin | Nov. 17, 1931 |
| 1,827,708 | Brown | Oct. 13, 1931 |
| 1,875,813 | Kaplan et al. | Sept. 6, 1932 |
| 1,932,112 | Lindgren | Oct. 24, 1933 |
| 2,072,139 | Smith | Mar. 2, 1937 |
| 2,150,665 | Tuft | Mar. 14, 1939 |
| 2,337,780 | Smith | Dec. 28, 1943 |
| 2,350,587 | Charley et al. | June 6, 1944 |
| 2,431,046 | Johnson | Nov. 18, 1947 |